(12) United States Patent
Dambrine et al.

(10) Patent No.: US 9,617,858 B2
(45) Date of Patent: Apr. 11, 2017

(54) FIBROUS REINFORCEMENT STRUCTURE FOR COMPOSITE MATERIAL PART HAVING A REDUCED THICKNESS PORTION

(71) Applicant: SNECMA, Paris (FR)

(72) Inventors: Bruno Jacques Gerard Dambrine, Le Chatelet en Brie (FR); Dominique Coupe, Le Haillan (FR); Jonathan Goering, York, ME (US); Jean-Noel Mahieu, Paris (FR)

(73) Assignee: SNECMA, Paris (FR)

( * ) Notice: Subject to any disclaimer, the term of this patent is extended or adjusted under 35 U.S.C. 154(b) by 499 days.

(21) Appl. No.: 14/364,958

(22) PCT Filed: Dec. 10, 2012

(86) PCT No.: PCT/FR2012/052851
§ 371 (c)(1),
(2) Date: Jun. 12, 2014

(87) PCT Pub. No.: WO2013/088038
PCT Pub. Date: Jun. 20, 2013

(65) Prior Publication Data
US 2014/0334935 A1   Nov. 13, 2014

Related U.S. Application Data

(60) Provisional application No. 61/570,379, filed on Dec. 14, 2011.

(51) Int. Cl.
*F01D 5/14* (2006.01)
*D03D 25/00* (2006.01)
(Continued)

(52) U.S. Cl.
CPC .............. *F01D 5/147* (2013.01); *B29C 70/24* (2013.01); *D03D 25/005* (2013.01); *F01D 5/286* (2013.01);
(Continued)

(58) Field of Classification Search
CPC ...... B29C 70/22; B29C 70/24; D03D 41/004; D03D 25/005; F01D 5/147; F01D 5/282;
(Continued)

(56) References Cited

U.S. PATENT DOCUMENTS

2008/0247877 A1    10/2008  Gallet
2011/0076431 A1*   3/2011   Desjoyeaux ............ B29B 11/16
                                                          428/36.1
2011/0176927 A1    7/2011   Alexander et al.

FOREIGN PATENT DOCUMENTS

RU         2452658 C2    6/2012

OTHER PUBLICATIONS

International Search Report Issued Nov. 20, 2013 in PCT/FR12/052851 Filed Dec. 10, 2012.

* cited by examiner

*Primary Examiner* — Richard Edgar
(74) *Attorney, Agent, or Firm* — Oblon, McClelland, Maier & Neustadt, L.L.P.

(57) ABSTRACT

A fiber structure reinforcing a composite material part woven as a single piece by multilayer weaving between plural first and second layers of yarns. The fiber structure includes a portion of decreasing thickness that presents: plural yarn withdrawal parts in surface continuity, with yarns interrupted from the first plural layers of yarns underlying the layer of yarns of the first plural layers of yarns situated in the surface of the structure; and plural yarn withdrawal parts in surface discontinuity, with yarns interrupted from the first plural layers of yarns situated at the surface of the
(Continued)

structure, each interrupted yarn replaced in the surface of the structure by a yarn of a layer of yarns underlying the first plural layers of yarns. The yarns of the second plural layers of yarns situated in the surface of the fiber structure are continuous over at least the entire portion of decreasing thickness.

12 Claims, 4 Drawing Sheets

(51) Int. Cl.
    *B29C 70/24*     (2006.01)
    *F01D 5/28*     (2006.01)
    *F01D 5/30*     (2006.01)

(52) U.S. Cl.
    CPC ........... *F01D 5/288* (2013.01); *F01D 5/3092* (2013.01); *F05D 2230/50* (2013.01); *Y02T 50/672* (2013.01)

(58) Field of Classification Search
    CPC ......... Y10T 428/24603; B29L 2031/08; Y02T 50/672
    See application file for complete search history.

FIBROUS REINFORCEMENT STRUCTURE FOR COMPOSITE MATERIAL PART HAVING A REDUCED THICKNESS PORTION

BACKGROUND OF THE INVENTION

The present invention relates to making parts out of composite material, and more particularly to making reinforcing fiber structures for such parts.

A particular field of application of the invention lies in making parts of structural composite material, i.e. parts having a fiber reinforcing structure that is densified by a matrix. Composite materials make it possible to fabricate parts that present overall weight that is less than that of the same parts when made of metal.

In the context of making fiber structures by multilayer weaving so as to produce the fiber reinforcement for a composite material part, such as a blade for an aeroengine, it is necessary during weaving of the structure to withdraw yarns both in the warp direction and in the weft direction in order to match reductions in the thickness of the part, e.g. in the fastening or in the trailing edge of the blade, so as to obtain a fiber preform that presents the quasi-final shape and dimensions of the blade (i.e. that presents its "net shape"). Withdrawing yarns in this way during weaving gives rise to non-woven yarns being present locally at the surface of the fiber structures (i.e. to yarns that are floated), which yarns are subsequently cut during a second operation.

Cutting these fibers at the surface of the structure gives rise locally to fiber misalignments and consequently, once the matrix has been deposited, to zones in the part that are rich in matrix material, which zones are potential sources of microcracking in the material of the part.

In addition, because of the weave present at the surface of the fabric, e.g. a satin weave, all of the floated yarns present after the last interlinking point of the yarn that has been extracted from the fiber need to be cut, thereby giving rise locally to a significant variation in the density of fibers.

OBJECT AND SUMMARY OF THE INVENTION

It is therefore desirable to be able to have fiber structures available with the quasi-final shape and dimensions of the composite material part that is to be made, in particular in portions thereof that are of decreasing thickness, and it is desirable for this to be possible with a surface state that is regular and with fiber density varying minimally in such portions.

To this end, the invention provides a fiber structure for reinforcing a composite material part, said structure being woven as a single piece by multilayer weaving between a first plurality of layers of yarns and a second plurality of layers of yarns, the fiber structure including at least one portion of decreasing thickness, the structure being characterized in that, in the portion of decreasing thickness, the fiber structure includes at its surface:

one or more yarn withdrawal parts in surface continuity in each of which yarns are interrupted that belong to a layer of yarns of the first plurality of layers of yarns underlying the layer of yarns of the first plurality of layers of yarns situated at the surface of the structure; and one or more yarn withdrawal parts in surface discontinuity in each of which yarns are interrupted in the layer of yarns of the first plurality of layers of yarns situated in the surface of the structure, each interrupted yarn being replaced in the surface of the structure by a yarn of a layer of yarns underlying the first plurality of layers of yarns; and in that the yarns of the layers of the second plurality of layers of yarns situated at the surface of the fiber structure are continuous over at least the entire portion of decreasing thickness.

The presence of yarn withdrawal parts both in surface continuity and in surface discontinuity in the fiber structure makes it possible to optimize the yarn continuity zones in the surface and consequently to limit misalignments and density variations of surface fibers in the structure, while also making such a structure easier to weave. If the yarns, e.g. the warp yarns, that are situated at the surface in the portion of decreasing thickness are conserved continuously over the entire length of that portion, then the yarns need to cross a large number of weft layers as a result of successive withdrawals of weft yarn layers all along the portion of decreasing thickness. These crossovers give rise to high levels of friction that can fray the continuous warp yarns at the surface and make the structure more difficult to weave. By interleaving yarn withdrawal parts in surface discontinuity between the withdrawal parts in surface continuity, such drawbacks are avoided, since surface continuity is taken up using new yarns as from the withdrawal part in surface discontinuity.

According to a particular aspect of the invention, in each part in surface discontinuity, each interrupted yarn of the layer of the first plurality of layers of yarns is interlaced with at least one yarn of a layer of the second plurality of layers of yarns immediately before exiting the structure.

By interlacing in this way the yarn extracted from the fiber structure, non-woven yarns due to extracting the yarn and that subsequently need to be cut at the end of weaving are eliminated. This reduces variation in the volume density of fibers in the fiber withdrawal parts in surface discontinuity.

According to another aspect of the invention, the fiber structure presents first and second outside faces extending in a longitudinal direction, the yarn withdrawal parts present in the first face being longitudinally offset relative to the yarn withdrawal parts present in the second face.

According to yet another aspect of the invention, the portion of decreasing thickness presents, in the direction of the yarns of the first plurality of layers of yarns, a decreasing number of layers of yarns of the second plurality of layers of yarns, the fiber structure including yarn withdrawal parts in surface discontinuity that are distributed as a function of a determined decrease in the number of layers of yarns of the second plurality of layers of yarns.

The invention also provides a composite material part comprising a fiber structure of the invention densified by a matrix. In particular, the part may constitute an aeroengine blade.

The invention also provides a turboprop fitted with a plurality of blades of the invention.

The invention also provides an aircraft fitted with at least one turboprop of the invention.

The present invention also provides a method of fabricating a fiber structure for reinforcing a composite material part, the method comprising weaving the fiber structure as a single piece by multilayer weaving between a first plurality of layers of yarns and a second plurality of layers of yarns, the fiber structure including at least one portion of decreasing thickness;

the method being characterized in that during the weaving of the portion of decreasing thickness, there are defined:

yarn withdrawal parts in surface continuity in each of which yarns of a layer of yarns of the first plurality of layers of yarns underlying the layer of yarns of the first plurality of layers of yarns situated at the surface of the structure are no longer woven with the yarns of the layers of the second plurality of layers of yarns; and yarn withdrawal parts in surface discontinuity in each of which yarns of the layer of yarns of the first plurality of layers of yarns situated in the surface of the structure are no longer woven with the yarns of the layers of the second plurality of layers of yarns, yarns from a layer of yarns underlying the first plurality of layers of yarns being used to replace in the surface of the texture the yarns that are no longer woven as from the surface discontinuity part; and in that the yarns of the layers of the second plurality of layers of yarns situated at the surface of the fiber texture are continuous, at least over the entire portion of decreasing thickness.

According to a particular aspect of the invention, the yarns of the layer of the first plurality of layers of yarns that are no longer woven from the surface discontinuity part are interlaced with at least one yarn of a layer of the second plurality of layers of yarns immediately prior to exiting the structure.

According to another aspect of the invention, the fiber structure presents first and second outside faces extending in a longitudinal direction, the yarn withdrawal parts present in the first face being longitudinally offset relative to the yarn withdrawal parts present in the second face.

According to yet another aspect of the invention, the portion of decreasing thickness presents, in the direction of the yarns of the first plurality of layers of yarns, a decreasing number of layers of yarns of the second plurality of layers of yarns, the fiber structure including yarn withdrawal parts in surface discontinuity that are distributed as a function of a determined decrease in the number of layers of yarns of the second plurality of layers of yarns.

BRIEF DESCRIPTION OF THE DRAWINGS

Other characteristics and advantages of the invention appear from the following description of particular embodiments of the invention given as non-limiting examples and with reference to the accompanying drawings, in which.

DETAILED DESCRIPTION OF EMBODIMENTS

The invention applies in general to making fiber structure suitable for constituting fiber reinforcement, referred to as preforms, for use in fabricating composite material parts, in particular aeroengine blades, the parts being obtained by densifying fiber structures with a matrix. Typically, the matrix is made of a resin, for composite materials that are used up to temperatures that are relatively low, typically up to 300° C., or by a refractory material such as carbon or ceramic for thermostructural composite materials.

Figure 1:
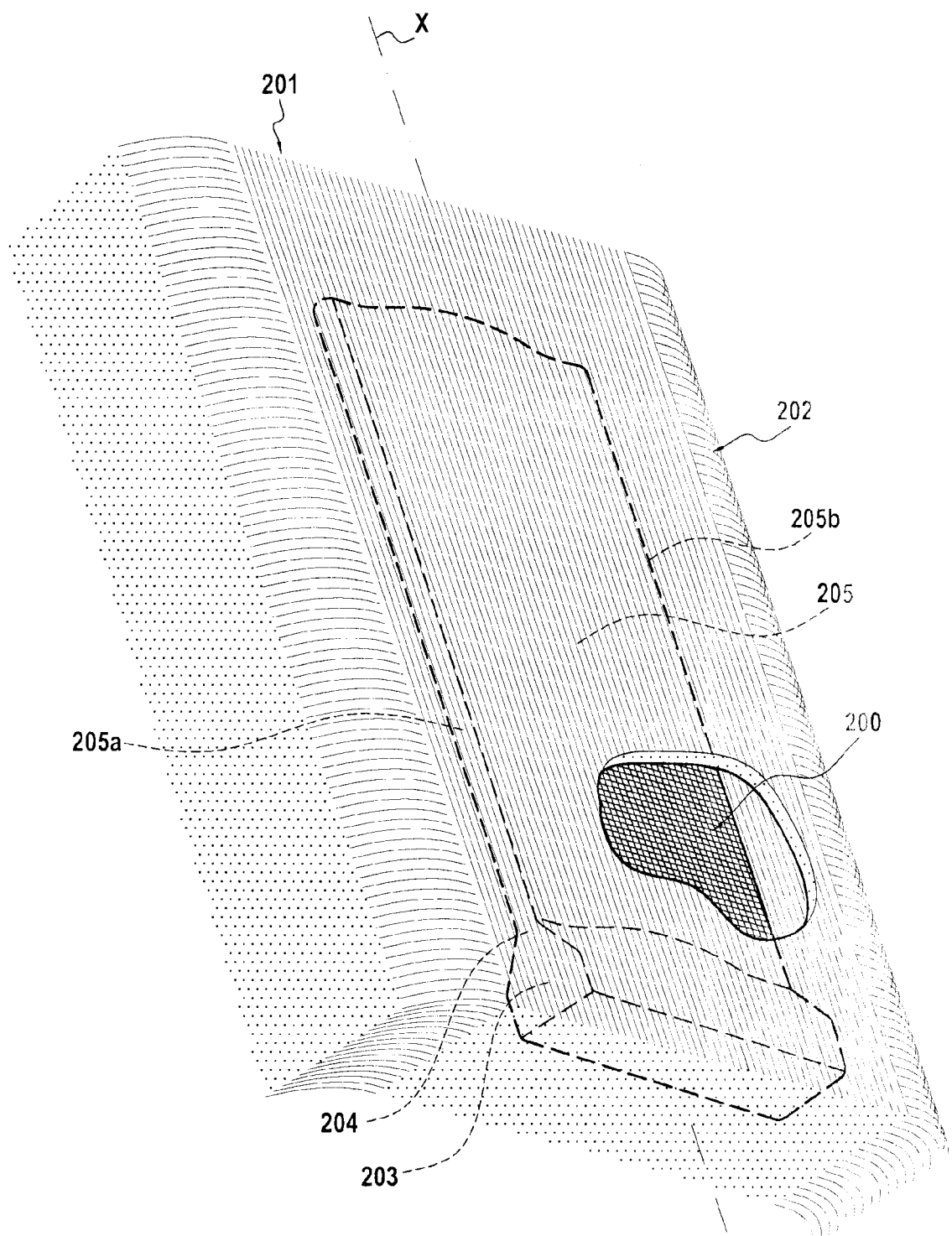
FIG. 1 is a diagrammatic view showing multilayer weaving of a fiber structure for fabricating an aeroengine blade in an embodiment of the invention.

FIG. 1 is a highly diagrammatic view of a fiber structure 200 for forming the fiber reinforcement of an aeroengine blade.

The fiber structure 200 is obtained by multilayer weaving performed in known manner using a jacquard type loom having a bundle of warp yarns or strands 201 organized as a plurality of layers, the warp yarns being interlinked by weft yarns 202 likewise arranged as a plurality of layers. An example of making a fiber preform for forming the fiber reinforcement of an aeroengine blade is described in particular in detail in the following documents: U.S. Pat. No. 7,101,154, U.S. Pat. No. 7,241,112, and WO 2010/061140, the contents of which is incorporated herein by reference.

The fiber structure 200 is woven in the form of a strip extending generally in a direction X corresponding to the longitudinal direction of the blade that is to be made. The fiber structure presents thickness that varies in a manner that is determined as a function of the longitudinal thickness of the airfoil profile of the blade that is to be made. In its portion that is to form a root preform, the fiber structure 200 presents extra thickness 203 determined as a function of the thickness of the root of the blade that is to be made and that may be implemented, for example, by using yarns of greater weight or by using an insert. The fiber structure 200 is extended by a portion of decreasing thickness 204 that is to form the tang of the blade followed by a portion 205 that is to form the airfoil of the blade. In a direction perpendicular to the direction X, the portion 205 presents a profile of thickness that varies between its edge 205a that is to form the leading edge of the blade and its edge 205b that is to form the trailing edge of the blade that is to be made.

The fiber structure 200 is woven as a single piece and, after cutting non-woven yarns, it needs to present the quasi-final shape and dimensions of the blade (i.e. its "net shape"). To this end, in the portions of varying thickness in the fiber structure, and in the portion of decreasing thickness 204, the thickness of the preform is reduced by progressively withdrawing layers of warp yarns and of weft yarns during weaving.

Figure 2:
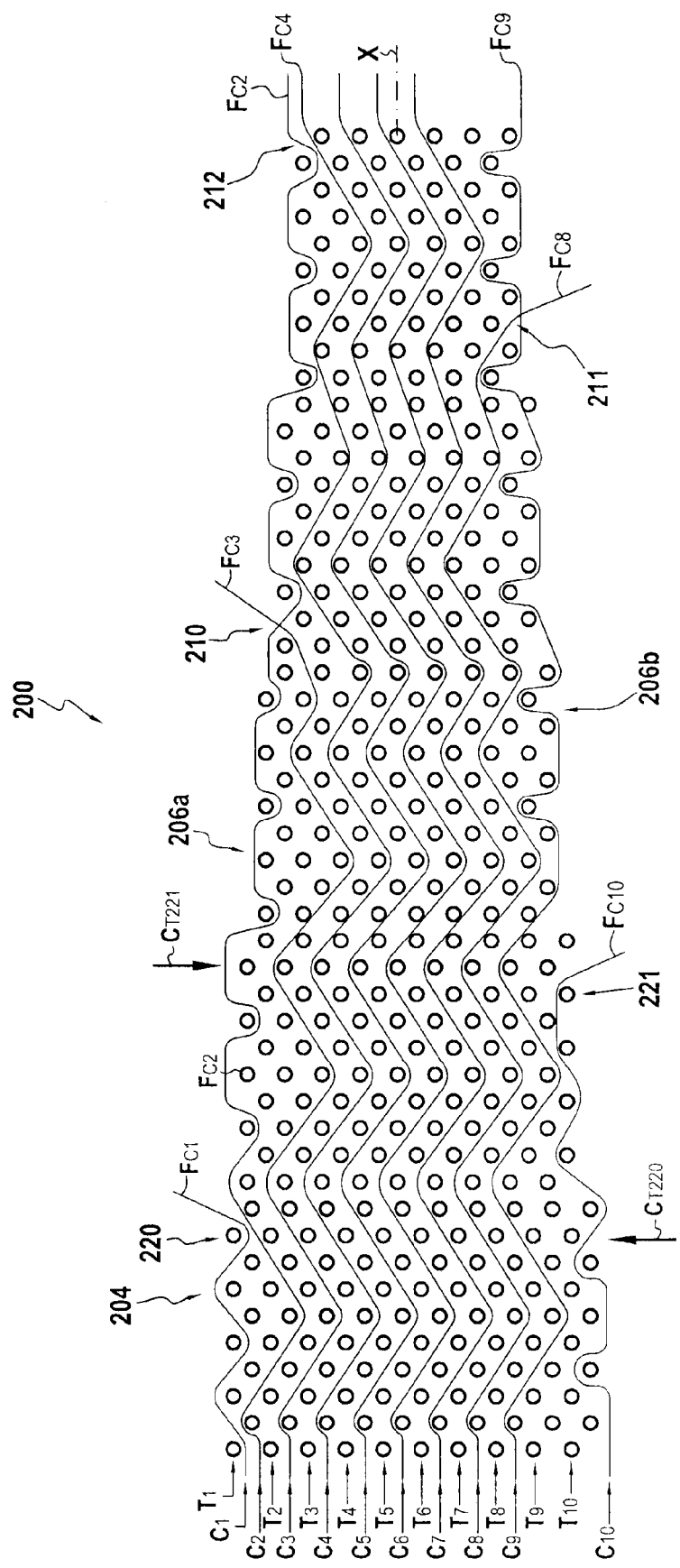
FIG. 2 is a weft section view on a larger scale of a portion of decreasing thickness of the FIG. 1 fiber structure.

FIG. 2 is a weft section view showing the weaving of a part of the portion of decreasing thickness 204 of the fiber structure 200, the structure 200 comprising at the beginning of this part of the portion of decreasing thickness 204, ten layers $C_1$ to $C_{10}$ of warp yarns (here shown as occupying a single column) extending in the direction X and ten layers $T_1$ to $T_{10}$ of weft yarns. In the example described here, the outside faces or skins 206a and 206b of the fiber structure 200 are made using a satin type weave, here a satin-4 weave (floating over three weft yarns before an interlink point), while the internal part of the structure 200 is made using an interlock type weave. The term "interlock" is used herein to mean a weave in which each layer of warp yarns interlocks a plurality of layers of weft yarns with all of the yarns in a given warp column having the same movement in the weave plane.

Other known types of multilayer weaving may be used, in particular such as those described in document WO 2006/136755, the content of which is incorporated herein by reference.

The fiber structure of the invention may in particular, but not exclusively, be woven using fibers made of carbon or of ceramic such as silicon carbide.

As weaving progresses in the direction X of the portion 204 of decreasing thickness, yarns of the warp yarn layers and also of the weft yarn layers are withdrawn from the structure 200. In the example described here, one layer of weft yarns is withdrawn for every ten warp columns.

Concerning the warp yarns, these are extracted or removed from the structure at a determined location referred to as the "warp yarn withdrawal part" and they are no longer woven with the weft yarns situated after the warp yarn withdrawal part. In the present invention, two types of warp yarn withdrawal part are to be distinguished, namely withdrawal parts referred to as being "in surface continuity" and withdrawal parts referred to as being "in surface discontinuity".

In withdrawal parts in surface continuity, there are removed from the texture warp yarns that belong to a layer of warp yarns underlying the layer of warp yarns situated at the surface of the structure, as applies for example to the withdrawal parts 210, 211, and 212 in surface continuity shown in FIG. 2. More precisely, at the part 210, there is withdrawn from the structure the warp yarn $F_{C3}$ that forms part of the warp yarn layer $C_3$ situated at this location of the fiber structure beneath the warp yarn layer $C_2$ that is situated at the surface of the structure. The same applies to the parts 211 and 212 from which there are withdrawn from the texture respectively the warp yarns $F_{C8}$ and $F_{C4}$ belonging to the warp yarn layers $C_8$ and $C_4$ situated respectively beneath the surface layers $C_9$ and $C_2$ of warp yarns.

By withdrawing warp yarns from a layer underlying the layer of warp yarns situated at the surface of the fiber structure, surface continuity is ensured for the layers of warp yarns at the surface of the preform, thereby making it possible in particular to avoid yarns becoming misaligned, as occurs when it is always the yarns on the surface that are cut, thereby giving rise after densification to zones that are rich in resin and that constitute sources of microcracks in the composite material. Furthermore, the warp yarn withdrawal parts that are in surface continuity make it possible to reduce the variation in the concentration of fibers at this location of the structure.

Nevertheless, if the yarns of the same layer of warp yarns are conserved at the surface of the fiber structure over the entire length of the portion of decreasing thickness, then the yarns in said layer are constrained to cross a large number of layers of weft yarns because of the way they are withdrawn progressively as weaving continues. These crossovers can give rise to high levels of friction that may fray the warp yarns and make the structure more difficult to weave.

To this end, and in accordance with the invention, the fiber structure also includes warp yarn withdrawal parts in surface discontinuity in which warp yarns are withdrawn from the fiber structure, which warp yarns belong to the warp yarn layer situated at the surface of the fiber structure, as applies for example in the parts 220 and 221 shown in FIG. 2. More precisely, in the part 220, there is withdrawn the yarn $F_{C1}$ forming part of the layer $C_1$ of warp yarns situated at the surface in this location of the fiber structure immediately after the column $C_{T220}$ of weft yarns. Once extracted from the fiber structure, the yarn $F_{C1}$ is replaced at the surface by the yarn $F_{C2}$ of the underlying layer $C_2$ of warp yarns that is woven beyond the part 220 with the same satin weave as was used for yarn $F_{C1}$ prior to the part 220. Similarly, from the part 221, there is withdrawn the yarn $F_{C10}$ that forms part of the layer $C_{10}$ of warp yarns situated at the surface in this location of the fiber structure immediately after the column $C_{T221}$ of weft yarns. Once extracted from the fiber structure, the yarn $F_{C10}$ is replaced at the surface by the yarn $F_{C9}$ of the underlying layer $C_9$ of warp yarns that is woven beyond the part 221 with the same satin weave as is used for the yarn $F_{C9}$ before the part 221.

The positioning of warp yarn withdrawal parts in surface discontinuity may be determined as a function of the number of weft layers that are withdrawn in order to limit friction and improve weaveability. By way of example, the fiber structure may include in each of its faces a warp yarn withdrawal part in surface discontinuity whenever five weft layers have been withdrawn and then another one after five more weft layers have been withdrawn, and so on. The fiber structure of the invention preferably has a majority of yarn withdrawal parts that are in surface continuity compared with the yarn withdrawal parts that are in surface discontinuity.

The yarn withdrawal parts, whether in surface continuity or discontinuity, that are present on a face of the fiber structure are preferably offset in the longitudinal direction of the structure relative to the withdrawal parts presented on the other face of said structure, as shown in FIG. 2 in order to balance the fiber structure.

The yarn withdrawal parts, whether in surface continuity or discontinuity, may also be present on only one of the faces of the fiber structure in order to optimize the surface state of one of the faces relative to the other.

Furthermore, according to an aspect of the invention, when a warp yarn is to be extracted from the fiber structure, said yarn is always interlaced with at least one yarn of the column of weft yarns that is situated immediately before the withdrawal part from which the warp yarn is extracted, with this being independent of the pattern of the weave at this location of the fiber structure. For example, in FIG. 2, the warp yarn $F_{C1}$ that is extracted from the fiber structure at the withdrawal part 221 is interlaced with two consecutive weft yarns of the weft yarn layer $T_9$ even though, in the satin-4 pattern implemented up to that point on the surface of the structure, the warp yarn $F_{C10}$ ought to leave the structure at the column preceding the part 221 without interlacing the weft yarn of the weft yarn column $C_{T220}$ situated at the surface of the structure. At the part 220, there is no need in this example to force any interlacing of the warp yarn $F_{C1}$, since it is extracted from the fiber structure 200 immediately after its point where it interlinks with the weft yarn situated at the surface of the column $C_{T220}$ of weft yarns.

By ensuring that the warp yarn is always interlaced with at least the last weft yarn situated immediately before its exit from the fiber structure, the number of weft yarns that are unwoven as a result of a warp yarn being extracted and that must subsequently be cut after weaving is thus reduced. This reduces variation in the density of fibers per unit volume in the warp yarn withdrawal parts that are in surface discontinuity.

Figure 3:
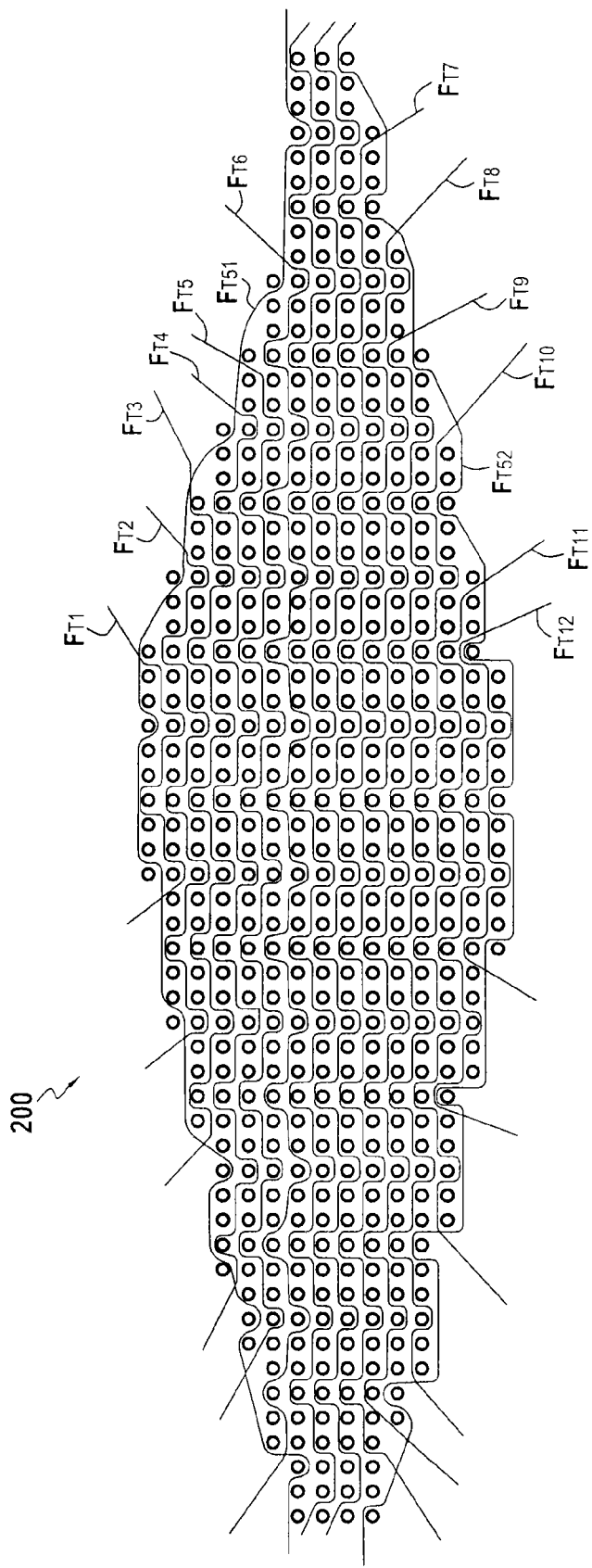
FIG. 3 is a warp section view on a larger scale of a portion of decreasing thickness of the FIG. 1 fiber structure.

In the example described herein, it is the warp yarns that are situated at the surface of the fiber structure that are extracted from the withdrawal parts in surface discontinuity. Under such circumstances, continuity is maintained of the weft yarns situated at the surface of the fiber structure, as shown in FIG. 3, which shows the weaving in a warp section view in a part of the profile of varying thickness of the portion 205 of the structure that is to form the airfoil of the blade and in which the weft yarns $F_{TS1}$ and $F_{TS2}$ situated in the surface on both sides of the fiber structure 200 are continuous over the entire structure, whereas the weft yarns $F_{T1}$ to $F_{T10}$ belonging to the weft yarn layers underlying the surface weft yarn layers to which the yarns $F_{TS1}$ and $F_{TS2}$ belong respectively are extracted progressively from the texture. It should be observed that the weave shown in FIG. 3 is different from the weave shown in FIG. 2.

In a variant of the present invention, the fiber texture includes yarn withdrawal parts in surface discontinuity and/or continuity in the weft yarn layers that are situated at the surface of the texture. Under such circumstances, continuity is maintained of the warp yarns situated at the surface of the fiber structure.

Once weaving of the fiber structure 200 has been completed, the non-woven yarns are cut, in particular those that have been extracted from the texture at the withdrawal parts whether in surface continuity or in surface discontinuity. This produces the fiber preform 100 as shown in FIG. 4, which preform is woven as a single piece.

Figure 4:
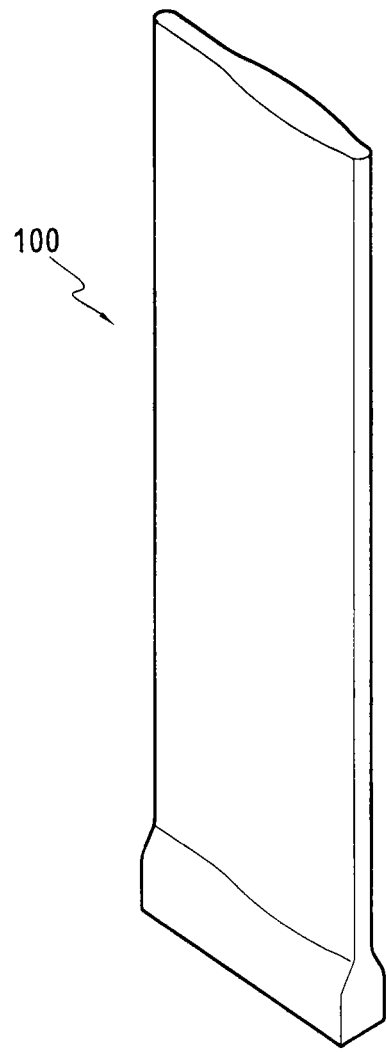
FIG. 4 is a diagrammatic perspective view of a blade fiber preform obtained from the FIG. 1 fiber structure.

Thereafter the fiber preform 100 is densified in order to form a blade 10 of composite material as shown in FIG. 4. The fiber preform that is to constitute the fiber reinforcement of the part that is to be fabricated is densified by filling in the pores of the preform, throughout all or part of its volume, with the material that constitutes the matrix. This densification may be performed in known manner using a liquid technique or a gaseous technique (chemical vapor infiltration (CVI)), or indeed by using both of these techniques one after the other.

The liquid technique consists in impregnating the preform with a liquid composition containing a precursor for the material of the matrix. The precursor is generally in the form of a polymer, such as a high performance epoxy resin, possibly diluted in a solvent. The preform is placed in a mold suitable for being closed in leaktight manner with a recess that has the shape of the final molded blade. Thereafter, the mold is closed and the liquid precursor of the matrix (e.g. a resin) is injected into the entire recess so as to impregnate all of the fiber structure of the preform.

The precursor is transformed into the matrix, i.e. it is polymerized, by applying heat treatment, generally by heating the mold after eliminating any solvent and curing the polymer, with the preform continuing to be held in the mold that has a shape corresponding to the shape of the part that is to be made.

When forming a matrix of carbon or of ceramic, the heat treatment consists in pyrolyzing the precursor in order to transform the matrix into a carbon or ceramic matrix depending on the precursor used and on pyrolysis conditions. By way of example, liquid precursors for ceramic, in particular for SiC, may be resins of the polycarbosilane (PCS) type, or of the polytitanocarbosilane (PTCS) type, or of the polysilazane (PSZ) type, whereas liquid precursors of carbon may be resins having a relatively high coke content, such as phenolic resins. A plurality of consecutive cycles, each running from impregnation to heat treatment, may be performed in order to achieve a desired degree of densification.

According to an aspect of the invention, in particular when forming an organic matrix, the fiber preform may be densified by the well-known resin transform molding (RTM) method. In the RTM method, the fiber preform is placed in a mold presenting the outside shape of the part that is to be made. A thermosetting resin is injected into the inside volume of the mold that contains the fiber preform. A pressure gradient is generally established in said inside space between the location where the resin is injected and orifices for exhausting the resin in order to control and optimize the way the preform is impregnated by the resin.

In known manner, the fiber preform may also be densified using a gaseous technique of chemical vapor infiltration (CVI) of the matrix. The fiber preform corresponding to the fiber reinforcement of the blade that is to be made is placed in an oven into which a reaction gas is admitted. The pressure and the temperature that exist inside the oven and the composition of the gas are selected in such a manner as to enable the gas to diffuse within the pores of the preform so as to form the matrix therein by depositing a solid material in the core of the material in contact with the fibers, which solid material is the result of a component of the gas decomposing or of a reaction between a plurality of components, in contrast to the pressure and temperature conditions that are specific to chemical vapor deposition (CVD) methods that lead to deposition taking place solely on the surface of the material.

An SiC matrix may be formed using methyltrichlorosilane (MTS) that gives SiC by decomposition of the MTS, whereas a carbon matrix may be obtained using hydrocarbon gases such as methane and/or propane that produce carbon by cracking.

It is also possible to perform densification by combining the liquid technique and the gaseous technique so as to facilitate implementation, limit cost, and limit the number of fabrication cycles while still obtaining characteristics that are satisfactory for the intended utilization.

Figure 5:
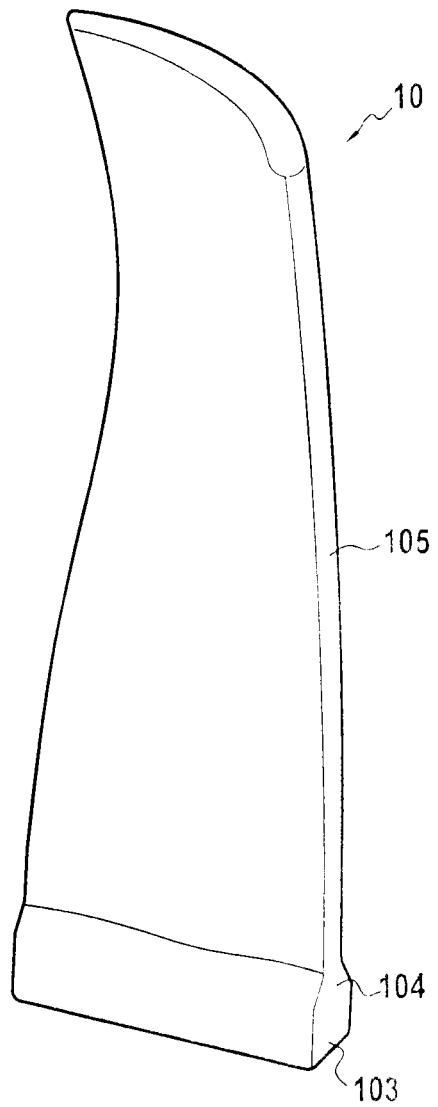
FIG. 5 is a diagrammatic perspective view of a composite material blade obtained by densifying the FIG. 4 preform with a matrix.

After densification, a composite material blade 10 is obtained, as shown in FIG. 5, that includes a root 103 in its bottom portion that is constituted by the extra thickness 203 of the fiber structure 200, which is extended by a tang 104 formed by the portion of decreasing thickness 204 of the structure 200, and by an airfoil 105 formed by the portion 205 of the fiber structure 200.

The invention claimed is:

1. A fiber structure for reinforcing a composite material part, the structure being woven as a single piece by multilayer weaving between a first plurality of layers of yarns and a second plurality of layers of yarns, the fiber structure including at least one portion of decreasing thickness,
   wherein, in the portion of decreasing thickness, the fiber structure includes at its surface:
   one or more yarn withdrawal parts in surface continuity in each of which yarns are interrupted that belong to a layer of yarns of the first plurality of layers of yarns underlying the layer of yarns of the first plurality of layers of yarns situated at the surface of the structure; and
   one or more yarn withdrawal parts in surface discontinuity in each of which yarns are interrupted in the layer of yarns of the first plurality of layers of yarns situated in the surface of the structure, each interrupted yarn being replaced in the surface of the structure by a yarn of a layer of yarns underlying the first plurality of layers of yarns; and
   wherein the yarns of the layers of the second plurality of layers of yarns situated at the surface of the fiber structure are continuous over at least the entire portion of decreasing thickness.

2. A fiber structure according to claim 1, wherein in each part in surface discontinuity, each interrupted yarn of the layer of the first plurality of layers of yarns is interlaced with at least one yarn of a layer of the second plurality of layers of yarns immediately before exiting the structure.

3. A structure according to claim 1, wherein the fiber structure presents first and second outside faces extending in a longitudinal direction, and the yarn withdrawal parts present in the first face are longitudinally offset relative to the yarn withdrawal parts present in the second face.

4. A fiber structure according to claim 1, wherein the portion of decreasing thickness presents, in a direction of the yarns of the first plurality of layers of yarns, a decreasing number of layers of yarns of the second plurality of layers of yarns, and wherein the fiber structure includes yarn withdrawal parts in surface discontinuity that are distributed as a function of a determined decrease in the number of layers of yarns of the second plurality of layers of yarns.

5. A composite material part comprising fiber reinforcement densified by a matrix, wherein the fiber reinforcement is formed by a fiber structure according to claim 1.

6. A part according to claim 5, constituting an aeroengine blade.

7. A turboprop comprising a plurality of blades according to claim 6.

8. An aircraft comprising at least one turboprop according to claim 7.

9. A method of fabricating a fiber structure for reinforcing a composite material part, the method comprising:
   weaving as a single piece by multilayer weaving between a first plurality of layers of yarns and a second plurality of layers of yarns, the fiber structure including at least one portion of decreasing thickness;
   wherein during the weaving of the portion of decreasing thickness, there are defined:
   yarn withdrawal parts in surface continuity in each of which yarns of a layer of yarns of the first plurality of layers of yarns underlying the layer of yarns of the first plurality of layers of yarns situated at the surface of the structure are no longer woven with the yarns of the layers of the second plurality of layers of yarns; and
   yarn withdrawal parts in surface discontinuity in each of which yarns of the layer of yarns of the first plurality of layers of yarns situated in the surface of the structure are no longer woven with the yarns of the layers of the second plurality of layers of yarns, yarns from a layer of yarns underlying the first plurality of layers of yarns being used to replace in the surface of the texture the yarns that are no longer woven as from the surface discontinuity part; and
   wherein the yarns of the layers of the second plurality of layers of yarns situated at the surface of the fiber texture are continuous, at least over the entire portion of decreasing thickness.

10. A method according to claim 9, wherein the yarns of the layer of the first plurality of layers of yarns that are no longer woven from the surface discontinuity part are interlaced with at least one yarn of a layer of the second plurality of layers of yarns immediately prior to exiting the structure.

11. A method according to claim 9, wherein the fiber structure presents first and second outside faces extending in a longitudinal direction, and the yarn withdrawal parts present in the first face are longitudinally offset relative to the yarn withdrawal parts present in the second face.

12. A method according to claim 9, wherein the portion of decreasing thickness presents, in a direction of the yarns of the first plurality of layers of yarns, a decreasing number of layers of yarns of the second plurality of layers of yarns, and the fiber structure includes yarn withdrawal parts in surface discontinuity that are distributed as a function of a determined decrease in the number of layers of yarns of the second plurality of layers of yarns.

* * * * *